Feb. 4, 1936.    J. RABINOWITZ    2,029,442
COMPOSITE STRIP
Filed March 16, 1935

INVENTOR.
JULIUS RABINOWITZ
BY
his ATTORNEY.

Patented Feb. 4, 1936

2,029,442

UNITED STATES PATENT OFFICE 2,029,442

COMPOSITE STRIP

Julius Rabinowitz, New York, N. Y.

Application March 16, 1935, Serial No. 11,526

2 Claims. (Cl. 28—1)

This invention relates to a composite strip and more particularly to a strip made up of at least two component parts which when assembled without the use of any fastening devices are held together securely.

An important object of the invention is to provide a flat strip comprising two flat strips so shaped that they can easily be assembled in suitable relation to each other to form the composite strip of greater thickness than the individual component strips and of a width less than the sum of the widths of the component parts. Other objects of the invention relate to simplicity of structure, economy in manufacture and efficiency in use.

In carrying out the invention in accordance with a preferred embodiment, each of the component parts or strips is made up on each side of the middle line thereof of a series of semicircles having their centers on said middle line and the centers of the semicircles on one side of the middle line are midway between the centers of the semicircles on the other side of said middle line. The component strips are then wound around each other without any twisting of the individual strips, the bottoms of the notches or recesses in each composite strip being brought substantially into contact with the bottoms of the notches in the other strip and the extreme narrowness of said notches at the bottoms thereof aids in holding the component strips together. It should be understood that while it is necessary to have the bottoms of the notches in the described relation with respect to each other, the contours of the projections between the notches may take different shapes, for example by trimming the component strips at their sides there might be produced a composite strip having substantially rectilinear edges. The composite strips thus formed may conveniently be used as straps for belts, as parts of wristbands for wrist-watches and, as straps in ladies' shoes.

Figure 1:
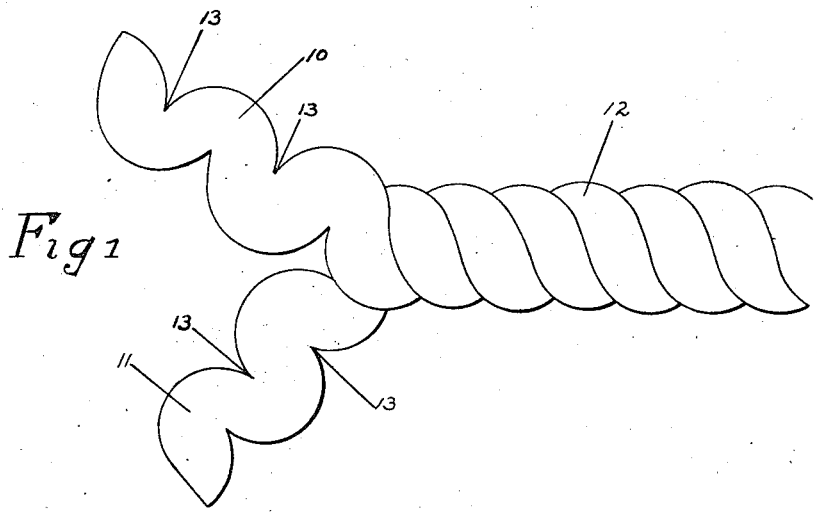
Figure 2:
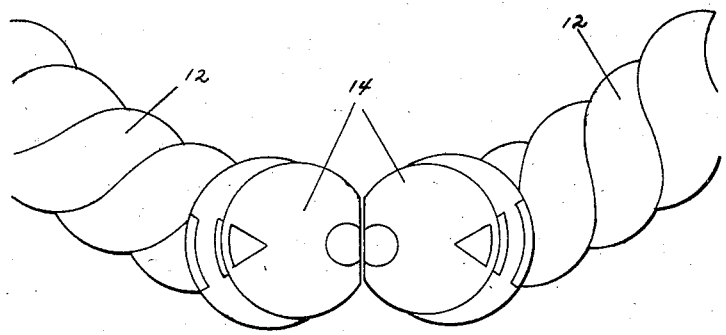
Figure 3:
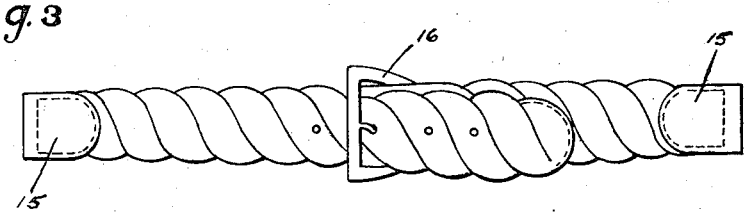

Other objects, features and advantages will appear upon consideration of the following description and of the drawing, in which Fig. 1 is a plan view showing two component strips shaped according to a preferred form of the invention with parts thereof assembled in a corresponding part of a composite strip and with other parts separated;

Fig. 2 is a fragmentary view illustrating a composite strip, according to the present invention, used in a belt; and Fig. 3 is a view illustrating a band for a wrist watch formed in accordance with the present invention.

Referring to the drawing, reference numerals 10 and 11 designate two component strips which may be combined in a composite strip 12. Each of the strips 10 and 11 is provided with notches 13 at regular intervals reaching substantially to its middle line and arranged alternately at opposite edges. Preferably these notches are formed between successive semicircles at each side of each component strip, the centers of the semicircles at one side of the strip being at the bottoms of the notches on the other strip. As most clearly shown in Fig. 1, the two strips 10 and 11 are twined about each other and the strips at the left of the completed portion may be combined by carrying the strip 10 down at the back and strip 11 up at the front to bring the bottom of the first vacant notch at the lower edge of strip 10 into engagement with the bottom of the first vacant notch at the top of strip 11, and to place strip 11 in the upper position and strip 10 in the lower position. Then the strip 11 is carried down at the back and strip 10 up at the front to bring the bottom of the vacant notch at the lower edge of strip 11 into engagement with the bottom of the first vacant notch at the upper edge of strip 10. These operations may be continued indefinitely until the desired length of composite strip is completed.

In Fig. 2 there is illustrated the front part of a belt comprising a composite strip 12 adapted for use as a strap and a clasp 14, and in Fig. 3 there are illustrated two pieces of the composite strip 12 with loops 15 for a wrist-watch and with a buckle 16 to fasten the ends together.

The composite strip is particularly striking and attractive in appearance when the component strips are in contrasting colors.

Rather stiff material such as artificial leather is particularly adapted for use in making the component strips 10 and 11. When made of material of the requisite stiffness, the composite strip keeps its shape well and is practically inextensible.

It should be understood that changes may be made in various parts of features and that various parts or features may be used without others without departing from the true scope and spirit of the invention.

Having thus described my invention, I claim

1. A composite strip comprising a plurality of component strips each of such component strips having notches extending from the edge substantially to the middle line and arranged alternately at opposite edges of the strip, and said component parts being twined about each other with the bottoms of the notches in each component part substantially in contact with the bottoms of the notches in the other strip.

2. A composite strip comprising two flat component strips each having at each edge a plurality of semicircles with notches between them arranged alternately at opposite edges and extending substantially to the middle line of the strip, said component strips being twined around each other with the bottoms of the notches in each one substantially in engagement with the bottoms of the other.

JULIUS RABINOWITZ.